July 28, 1959
T. F. W. MEYER
2,896,987
PRESSURE SEAL STRUCTURE
Filed Dec. 9, 1955
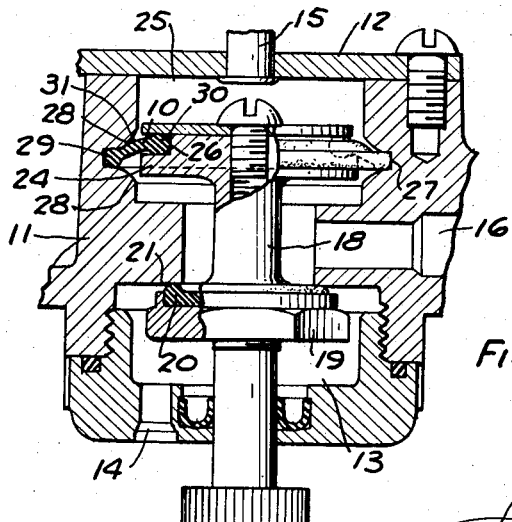
Fig. 1
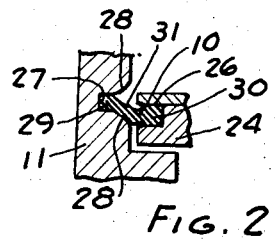
Fig. 2
Fig. 3
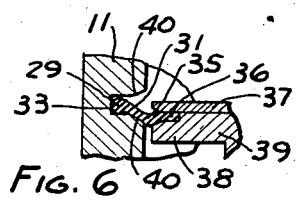
Fig. 6
Fig. 4
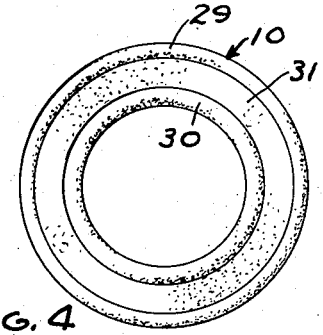
Fig. 5
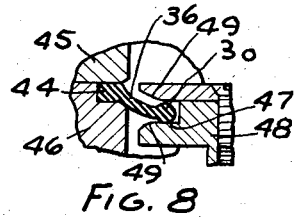
Fig. 8
Fig. 7
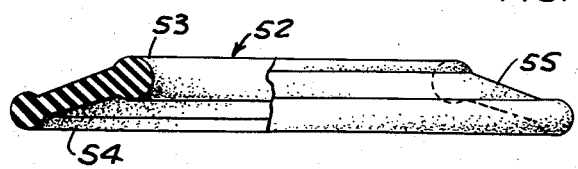
Fig. 9
INVENTOR.
THEODORE F. W. MEYER
BY
Barnes, Kisselle, Laughlin & Raisch
ATTORNEYS.

United States Patent Office 2,896,987
Patented July 28, 1959

2,896,987

PRESSURE SEAL STRUCTURE

Theodore F. W. Meyer, Delray Beach, Fla., assignor to Equi-Flex Products, Incorporated, Detroit, Mich., a corporation of Michigan Application December 9, 1955, Serial No. 552,067

13 Claims. (Cl. 288—19)

This invention relates to a pressure seal for use between two relatively movable elements where the range of movement is relatively small.

The invention can be used to provide a pressure seal between elements of various types movable relatively to each other in various ways. An exemplary application of the invention is a piston and cylinder which reciprocate axially relatively to each other with a relatively small amplitude.

An object of the inventin is to provide a simple, inexpensive pressure seal structure having improved durability and low friction characteristics and facilitating reduction in the cost of manufacture of apparatus in which the seal is used.

In general the invention contemplates a seal having radially opposite edge portions adapted to be inserted in generally apposed grooves in the piston and cylinder and having an intermediate web portion which flexes axially upon relative reciprocation of the piston and cylinder. Various forms of the invention are shown in the accompanying drawings.

Fig. 1 is a fragmentary generally sectional view of a piston operated valve utilizing the seal of this invention.

Fig. 2 is a fragmentary sectional view, illustrating a position of the seal in a different position of the valve.

Fig. 3 is an enlarged partly sectional view, illustrating structure of the seal.

Fig. 4 is an elevational view of the seal taken in an axial direction.

Fig. 5 is a fragmentary sectional view, illustrating a modified form of the invention.

Fig. 6 is a view similar to Fig. 5 but showing the piston and seal in a different position.

Fig. 7 is a fragmentary sectional view, illustrating another modified form of the invention.

Fig. 8 is similar to Fig. 7 but showing the piston and seal in a different position.

Fig. 9 is an enlarged partly sectional view, illustrating a third modified form of the invention.

The seal 10 of this invention is illustrated in the drawings as being installed in a valve having a valve body 11 with a cover 12 defining a valve chamber 13 which has inlets 14 and 15 and an outlet 16. A valve member 18 is axially shiftably mounted in the valve chamber as shown. The valve member includes a support 19 for a valve seal 20 arranged to engage against a shoulder or valve seat 21 on the valve body. The valve is arranged to control the flow of fluid from inlet 14 to outlet 16.

The valve is pressure actuated and for this purpose valve member 18 is provided with a piston 24. The valve member shifts downwardly as Fig. 1 is viewed to open position when fluid pressure introduced through inlet 15 into the portion 25 of the valve chamber above piston 24 exceeds the pressure at inlet 14. The valve closes when the pressure at inlet 14 exceeds the pressure in chamber 25. The seal 10 of this invention is inserted in generally apposed circumferential grooves 26 and 27 in piston 24 and valve body 11, respectively, to seal the upper portion 25 of the valve chamber from the other portions thereof. Groove 27 has preferably rounded sidewalls 28.

The seal comprises a circular, open center body formed of a suitable flexible sealing material which in various applications may comprise a natural or synthetic rubber, a plastic or the like. The seal has a radially outer edge portion 29 having annular bulbous or bead form (Fig. 3). The ring has a radially inner edge portion 30 also having annular bulbous form. A relatively thin, flat, flexible web portion 31 interconnects the inner and outer bulbous or bead portions. In the form of the invention shown in Figs. 1–4, the ring has generally flat form with beads 29 and 30 and web 31 lying generally in the same plane.

In use, inner bead 30 is engaged within a groove 26 on piston 24 with web 31 and bead 29 extending radially outwardly. Bead 29 is inserted in groove 27 in body 11. During operation of the valve in the manner described, pressure differentials on the sides of the seal force the beads axially against the sides of the grooves to provide a seal between the upper portion 25 and the lower portion of chamber 13. When piston 24 reciprocates within valve body 11 responsively to the pressure differentials, web portion 31 of the seal flexes axially so that beads 29 and 30 maintain their seal against body 11 and piston 24, respectively. Web 31 tends to flex into sealing engagement against sidewalls 28 adjacent groove 27 as shown in Figs. 1 and 2.

With this construction, friction between the seal and the adjacent parts of the cylinder and piston is reduced to a minimum so that the efficiency of piston 24 and the durability of the seal are materially improved over structures heretofore known. The seal is of a self-centering nature in that it holds the valve member 18 centered without requiring mechanical contact between the valve member and the body. Moreover, adjacent portions of the piston and cylinder or valve body may have relatively large clearance so that apparatus utilizing this seal structure may be manufactured at reduced cost.

The modified form of the invention shown in Figs. 5 and 6 is similar to the principal form except that seal 35 has a generally flat radially inner portion 36 adapted to be clamped axially between members 37 and 38 of piston 39. Web portion 31 extends radially outwardly so that bead 29 projects into annular recess 33 in body 11. Operation of this form of the invention is similar to operation of the principal form. Bead 29 is forced into sealing engagement against a side of groove 33 responsively to pressure on one side of the piston. Web 31 flexes axially when piston 39 shifts from a position such as that shown in Fig. 5 to a position such as that shown in Fig. 6 and the web tends to seal against a sidewall 40 adjacent groove 33.

The modified form of the invention shown in Figs. 7 and 8 is similar to the principal form except that seal 43 has an outer portion 44 adapted to be clamped axially between adjacent portions 45 and 46 of the valve body with web portion 31 extending radially inwardly and bead 30 projecting into an annular recess 47 in piston 48. Operation of this form of the invention is similar to operation of the principal form. Bead 30 is forced into sealing engagement against a side of groove 47 by pressure on one side of the seal. When piston 48 shifts from a position such as that shown in Fig. 7 to a position such as that shown in Fig. 8, web 31 flexes axially to maintain the seal and tends to flex into sealing engagement with a surface 49 adjacent groove 47 in the piston.

The modified form of the invention shown in Fig. 9 is similar to the principal form of the invention except that seal 52 has an inner bead 53 and an outer bead 54 which lie in different axial planes with the interconnecting web portion 55 having conical shape. Use of this form of the invention is similar to use of the principal form except that it is intended for use where the annual grooves in a piston and cylinder wall are axially offset in neutral position.

In this form, the preshaped conical form tends to hold the inner member, such as a valve member, in a normal position toward the apex of the cone.

The seal member can be likened to a combination of the well-known O-ring and a diaphragm. This is because pressure flexes the material into sealing engagement with a mechanical part and the web functions somewhat as a sealing diaphragm. It is particularly advantageous in parts of small construction. With a diaphragm, for example, the outer peripheral edge must be held in sealed relationship with a cooperating part accomplished, for example, by screws arranged in an annular array around the edge of the diaphragm. In some small mechanisms there is not sufficient room for this type of fastening. Since the seal member requires no such fastening at its outer peripheral edge, it can be used with parts designed with considerably smaller cross dimensions.

I claim:

1. In an apparatus having two elements mounted for relative linear movement and having means forming generally apposed grooves, a seal for providing a fluid tight seal between said elements, said seal being formed of a relatively flexible material such as rubber, plastic or the like, said seal having one edge portion engaged within a groove in one of said elements and having another edge portion engaged within a groove on the other of said elements so that said seal extends generally transversely of the direction of relative movement of said elements, said seal being flexible responsively to fluid pressure at one side of said seal so that at least one of said edge portions sealingly engages against its respective groove wall, said seal also being flexible between said edge portions to facilitate relative linear movement of said elements while the seal at said one edge portion is maintained.

2. In apparatus having two generally concentric elements mounted for relative generally axial movement and having means forming generally apposed grooves, a seal for providing a fluid tight seal between said elements, said seal being formed of a relatively flexible material such as rubber, plastic or the like, said seal comprising a closed ring, said ring having an inner radial edge portion engaged within a groove in one of said elements and having an outer radial edge portion engaged within a groove on the other of said elements so that said ring extends generally transversely of the direction of relative movement of said elements, said ring being flexible responsively to fluid pressure at one side of said ring so that at least one of said edge portions sealingly engages against its respective groove wall, said ring also being flexible between said edge portions to facilitate relative axial movement of said elements while the seal at said one edge portion is maintained.

3. In an apparatus having two generally concentric elements mounted for generally axial relative movement and having means forming generally apposed grooves, a seal member for providing a fluid tight seal between said elements, said seal being formed of a relatively flexible material such as rubber, plastic or the like, said seal member having the form of a generally circular open center ring, said ring having a radially outer edge portion engaged within a groove in one of said elements and having a radially inner edge portion engaged within a groove in the other of said elements so that said ring extends generally transversely of the direction of relative movement of said elements, at least one of said edge portions having annular bulbous form and being sealingly engageable with its respective groove responsively to fluid pressure at one side of said ring, said ring being flexible between said edge portions to facilitate relative linear movement of said elements while the seal at said one edge portion is maintained.

4. In an apparatus having two generally concentric elements mounted for generally axial relative movement and having means forming generally apposed grooves, a seal member for providing a fluid tight seal between said elements, said seal being formed of a relatively flexible material such as rubber, plastic or the like, said seal member having the form of a generally circular open center ring, said ring having a radially outer edge portion engaged with in a groove in one of said elements and having a radially inner edge portion engaged within a groove in the other of said elements so that said ring extends generally transversely of the direction of relative movement of said elements, said edge portions of said ring having annular bulbous form, said edge portions being sealingly engageable within their respective grooves responsively to pressure at the sides of said ring, said ring being flexible between said edge portions to facilitate relative movement of said elements while the seal at said edge portions is maintained.

5. The structure defined in claim 4 wherein said ring has generally flat form with said inner and outer portions lying generally in the same plane.

6. The structure defined in claim 4 wherein said radially inner and outer portions lie in different planes and the interconnecting portion has generally conical form.

7. In an apparatus having two generally concentric elements mounted for generally axial relative movement and having means forming generally apposed grooves, a seal member for providing a fluid tight seal between said elements, said seal being formed of a relatively flexible material such as rubber, plastic or the like, said seal member having the form of a generally circular open center ring, said ring having a radially outer edge portion engaged within a groove in one of said elements and having a radially inner edge portion engaged within a groove in the other of said elements so that said ring extends generally transversely of the direction of relative movement of said elements, one of said edge portions being anchored fixedly within its groove, the other of said edge portions having annular bulbous form and being disposed floatingly within its groove, said other portion of said ring being sealingly engageable within its groove responsively to fluid pressure at the sides of said ring, said ring being flexible between said edge portions to facilitate relative movement of said elements while maintaining said seal at said other edge portion.

8. The structure defined in claim 7 wherein said radially inner portion has generally annular bulbous form.

9. The structure defined in claim 7 wherein said radially outer portion has generally annular bulbous form.

10. In an apparatus having two elements mounted for relative linear movement, means forming a groove on at least one of said elements, said groove having an outwardly rounded side wall forming a sealing surface, a seal member for providing a fluid tight seal between said elements, said seal being formed of a relatively flexible material such as rubber, plastic or the like, said seal member having a bulbous portion floatingly but sealingly disposed within said groove on said one element, means securing another portion of said seal member to the other of said elements so that said seal member extends generally transversely to the direction of relative movement of said elements, said seal member having an intermediate portion interconnecting said bulbous portion and said other portion thereof, said intermediate portion being flexible responsively to fluid pressure at one side of said seal member for sealing engagement against said sealing surface.

11. In apparatus having two elements mounted for relative linear movement, means forming a groove on at least one of said elements, said groove having a bottom and having outwardly rounded side walls forming sealing surfaces, a seal member for providing a fluid tight seal between said elements, said seal being formed of a relatively flexible material such as rubber, plastic or the like, said seal member having a bulbous portion disposed within said groove, means securing another portion of said seal member to the other of said elements so that said seal member extends in a direction transverse to the direction of relative movement of said elements, said seal member having an extent in said transverse direction such that said bulbous portion seats sealingly against said bottom of said groove, said seal member having an intermediate portion interconnecting said bulbous portion and said other portion thereof, said intermediate portion being flexible responsively to fluid pressure at the sides of said seal member for sealing engagement against said sealing surfaces.

12. In apparatus having means defining a chamber and means forming a piston mounted for relative linear movement within the chamber, a wall of said chamber and said piston including means defining apposed grooves, a seal element formed of a relatively flexible material such as rubber, plastic or the like, said seal element having one edge portion engaged within the groove in the chamber wall and having another edge portion engaged within the groove in the piston wall, said seal element being flexible responsively to fluid pressure at one side thereof so that an edge portion thereof sealingly engages its respective groove wall, said seal element also being flexible between said edge portions to facilitate relative linear movement of said piston in said chamber while the seal at the latter said edge portion is maintained.

13. The combination defined in claim 12 wherein at least one of said edge portions is floatingly disposed within its groove.

References Cited in the file of this patent

UNITED STATES PATENTS

| | | |
|---|---|---|
| 1,313,648 | Steenstrup | Aug. 19, 1919 |
| 1,740,800 | Wiberg | Dec. 24, 1929 |
| 1,915,562 | Wahlsten | June 27, 1933 |
| 2,397,486 | Hoertz | Apr. 2, 1946 |
| 2,417,693 | Lange | Mar. 18, 1947 |
| 2,599,767 | Long | June 10, 1952 |